(12) United States Patent
Yamazaki et al.

(10) Patent No.: US 10,883,461 B2
(45) Date of Patent: Jan. 5, 2021

(54) ELECTROMAGNETIC SOLENOID AND FUEL INJECTION VALVE

(71) Applicant: Hitachi Automotive Systems, Ltd., Hitachinaka (JP)

(72) Inventors: Akihiro Yamazaki, Hitachinaka (JP); Takahiro Saito, Hitachinaka (JP); Nobuaki Kobayashi, Hitachinaka (JP); Akiyasu Miyamoto, Hitachinaka (JP); Yoshihito Yasukawa, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/084,365

(22) PCT Filed: Feb. 16, 2017

(86) PCT No.: PCT/JP2017/005643
§ 371 (c)(1),
(2) Date: Sep. 12, 2018

(87) PCT Pub. No.: WO2017/159198
PCT Pub. Date: Sep. 21, 2017

(65) Prior Publication Data
US 2019/0078543 A1 Mar. 14, 2019

(30) Foreign Application Priority Data
Mar. 14, 2016 (JP) .................. 2016-049222

(51) Int. Cl.
*F16K 31/06* (2006.01)
*F02M 51/06* (2006.01)
(Continued)

(52) U.S. Cl.
CPC ........ *F02M 51/0671* (2013.01); *F02M 51/06* (2013.01); *F02M 51/0628* (2013.01);
(Continued)

(58) Field of Classification Search
CPC .............. F16K 27/029; F16K 31/0655; F16K 31/0658; F16K 31/0675; F16K 31/0696;
(Continued)

(56) References Cited

U.S. PATENT DOCUMENTS 5,732,888 A * 3/1998 Maier ................ F02M 51/0614
239/585.1
7,051,960 B2 * 5/2006 Oguma .............. F02M 51/0671
239/585.1
(Continued)

FOREIGN PATENT DOCUMENTS

JP      2007-218205 A      8/2007
JP      2011-89432 A       5/2011
(Continued)

OTHER PUBLICATIONS

International Search Report (PCT/ISA/210) issued in PCT Application No. PCT/JP2017/005643 dated Apr. 18, 2017 with English translation (four pages).
(Continued)

*Primary Examiner* — Matthew W Jellett
(74) *Attorney, Agent, or Firm* — Crowell & Moring LLP (57) ABSTRACT

Electromagnetic solenoid has movable core having end surface that is formed between inner circumferential surface and outer circumferential surface of movable core; and fixed core having end surface that is formed between inner circumferential surface and outer circumferential surface of fixed core and faces the end surface of movable core. Ring-shaped protruding portion is formed at least either one of the end surface of the movable core or the end surface of the fixed core. Protruding portion is provided at a position that is shifted to a radially inner circumferential side of the end surface. A length between apex and inner circumferential edge of protruding portion is shorter than a length
(Continued)

between the apex and an outer circumferential edge of protruding portion.

8 Claims, 8 Drawing Sheets

(51) Int. Cl.
*H01F 7/16* (2006.01)
*H01F 7/08* (2006.01)
*F16K 27/02* (2006.01)

(52) U.S. Cl.
CPC ...... *F16K 31/0655* (2013.01); *F16K 31/0675* (2013.01); *F16K 31/0696* (2013.01); *H01F 7/081* (2013.01); *H01F 7/16* (2013.01); *H01F 7/1607* (2013.01); *F02M 51/0632* (2013.01); *F02M 2200/02* (2013.01); *F02M 2200/08* (2013.01); *F02M 2200/9038* (2013.01); *F02M 2200/9061* (2013.01); *F16K 27/029* (2013.01); *F16K 31/0658* (2013.01); *H01F 2007/085* (2013.01); *H01F 2007/086* (2013.01); *H01F 2007/1661* (2013.01)

(58) Field of Classification Search
CPC ............... F02M 51/06; F02M 51/0671; F02M 51/0628; F02M 51/0632; F02M 2200/09038; F02M 2200/02; F02M 2200/08; F02M 2200/9061; H01F 7/16; H01F 7/1607; H01F 7/081; H01F 2007/085; H01F 2007/086; H01F 2007/1661

See application file for complete search history.

(56) References Cited

U.S. PATENT DOCUMENTS

| | | | | |
|---|---|---|---|---|
| 7,086,614 B2 * | 8/2006 | Stier | ................... | F02M 51/0671 |
| | | | | 239/585.2 |
| 7,278,594 B2 * | 10/2007 | Koyanagi | .......... | F02M 51/0657 |
| | | | | 239/585.1 |
| 8,991,783 B2 * | 3/2015 | Abe | .................... | F02M 51/0653 |
| | | | | 239/533.11 |
| 9,291,135 B2 * | 3/2016 | Ohwada | ............. | F02M 51/0614 |
| 10,190,555 B2 * | 1/2019 | Takaoku | ............ | F02M 51/0671 |
| 2007/0194151 A1 | 8/2007 | Hayatani et al. | | |
| 2012/0204839 A1 | 8/2012 | Ohwada et al. | | |
| 2017/0074222 A1 | 3/2017 | Takaoku et al. | | |

FOREIGN PATENT DOCUMENTS

| | | |
|---|---|---|
| JP | 2015-204345 A | 11/2015 |
| WO | WO 2015/136974 A1 | 9/2015 |

OTHER PUBLICATIONS

German-language Written Opinion (PCT/ISA/237) issued in PCT Application No. PCT/JP2017/005643 dated Apr. 18, 2017 (four pages).

* cited by examiner

ELECTROMAGNETIC SOLENOID AND FUEL INJECTION VALVE

TECHNICAL FIELD

The present invention relates to an electromagnetic solenoid and a fuel injection valve having the electromagnetic solenoid.

BACKGROUND ART

As a background art in a technical field of the present invention, there has been known a fluid control solenoid disclosed in JP2015-204345 (Patent Document 1). This fluid control solenoid has a structure in which a fixed magnetic core and a movable element that is driven by being attracted by the fixed magnetic core are provided, a protruding or convex portion formed by a curved surface having a radius of curvature in a convex direction is formed at an end surface portion, on the fixed magnetic core side, of the movable element throughout an entire circumference of the movable element, and the convex portion serves as a colliding portion when the movable element strikes against or collides with the fixed magnetic core with the movable element inclined. Further, the convex portion is formed such that a radius of curvature R2 of the convex portion is larger than a radius of curvature R1 of a corner R-portion (a round surface, a round chamfered portion) that connects an outer circumferential surface and the end surface portion of the movable element. Furthermore, the convex portion is formed such that radii of curvature of parts extending from the convex portion to a flat portion on an inside diameter side and extending from the convex portion to the corner R-portion on an outside diameter side continuously change in a radial direction. Such a convex portion is formed by a surface treatment layer provided at the colliding portion (see abstract of Patent Document 1). In this fluid control solenoid, an occurrence of an excessive stress at the colliding portion is prevented without decrease in a magnetic attraction force when the movable element collides with the fixed magnetic core with the movable element inclined, then reliability of the fluid control solenoid can be improved.

CITATION LIST

Patent Document

Patent Document 1: Japanese Unexamined Patent Application Publication No. JP2015-204345

SUMMARY OF THE INVENTION

Technical Problem

The convex portion of the fluid control solenoid (an electromagnetic solenoid) of Patent Document 1 is provided on an outer circumferential side of the movable element (a movable core). Because of this, in a contact state in which the movable element and the fixed magnetic core (a fixed core) contact each other, a contact area of the both of movable element and fixed magnetic core becomes large, and it takes time for a magnetic flux to diminish after stop of energization to a coil, then there is a possibility that property of cutting (or disappearing) of the magnetic flux (magnetism) (hereinafter, called magnetism cutting property) will be degraded.

The degradation of the magnetism cutting property causes degradation of a response (a valve-closing response) of a fuel injection valve upon valve closing. If the valve-closing response is degraded, a fuel injection amount does not change linearly with respect to an energization time to the coil. Especially in a region where a small amount of the fuel is injected, it becomes difficult to precisely control the fuel injection amount.

An object of the present invention is therefore to provide an electromagnetic solenoid and a fuel injection valve which can suppress the stress generated at the contact portion between the movable core and the fixed core and improve the magnetism cutting property.

Solution to Problem

To achieve the above object, an electromagnetic solenoid comprises: a movable core having an end surface that is formed between an inner circumferential surface and an outer circumferential surface of the movable core; a fixed core having an end surface that is formed between an inner circumferential surface and an outer circumferential surface of the fixed core and faces the end surface of the movable core; and a ring-shaped protruding portion formed at at least either one of the end surface of the movable core or the end surface of the fixed core, and the protruding portion is provided at a position that is shifted to a radially inner circumferential side of the end surface where the protruding portion is provided, and a length between an apex and an inner circumferential edge of the protruding portion is shorter than a length between the apex and an outer circumferential edge of the protruding portion.

Further, to achieve the above object, a fuel injection valve comprises: a valve seat and a valve body opening and closing a fuel passage in cooperation with each other; a movable element having at one end thereof the valve body and having at the other end thereof a movable core; and a fixed core attracting the movable core by exerting a magnetic attraction force on the movable core, and the movable core has an end surface that is formed between an inner circumferential surface and an outer circumferential surface of the movable core, the fixed core has an end surface that is formed between an inner circumferential surface and an outer circumferential surface of the fixed core and faces the end surface of the movable core, a ring-shaped protruding portion is formed at at least either one of the end surface of the movable core or the end surface of the fixed core, the protruding portion is provided at a position that is shifted to a radially inner circumferential side of the end surface where the protruding portion is provided, and a length between an apex and an inner circumferential edge of the protruding portion is shorter than a length between the apex and an outer circumferential edge of the protruding portion.

Effects of the Invention

According to the present invention, by suppressing the stress generated at the contact portion between the movable core and the fixed core and improving the magnetism cutting property, the valve-closing response can be improved.

BRIEF DESCRIPTION OF THE DRAWINGS

FIG. 1 is a sectional view of a fuel injection valve according to an embodiment of the present invention, cut along an axial center line 1a.

FIG. 5A is an enlarged sectional view showing an example of a structure or a shape of a protruding portion (a convex portion) 27ak of the movable core 27a.

FIG. 5B is an enlarged sectional view showing an example of a structure or a shape of the protruding portion (the convex portion) 27ak of the movable core 27a.

FIG. 10 is an enlarged sectional view of the movable core 27a.

EMBODIMENTS FOR CARRYING OUT THE INVENTION

An embodiment of the present invention will be explained below with reference to FIGS. 1 to 3.

A general configuration or structure of a fuel injection valve 1 will be explained with reference to FIG. 1. FIG. 1 is a sectional view of the fuel injection valve according to the embodiment of the present invention, cut along an axial center line 1a. The axial center line 1a coincides with an axis (a valve axis) 271 (see FIG. 3) of a movable element (a valve component or a valve assembly) 27 with which a valve body 27c, a rod part (a connecting part) 27b and a movable core 27a are integrally formed, and also coincides with an axial center line 5f of a cylindrical body 5.

Figure 1:
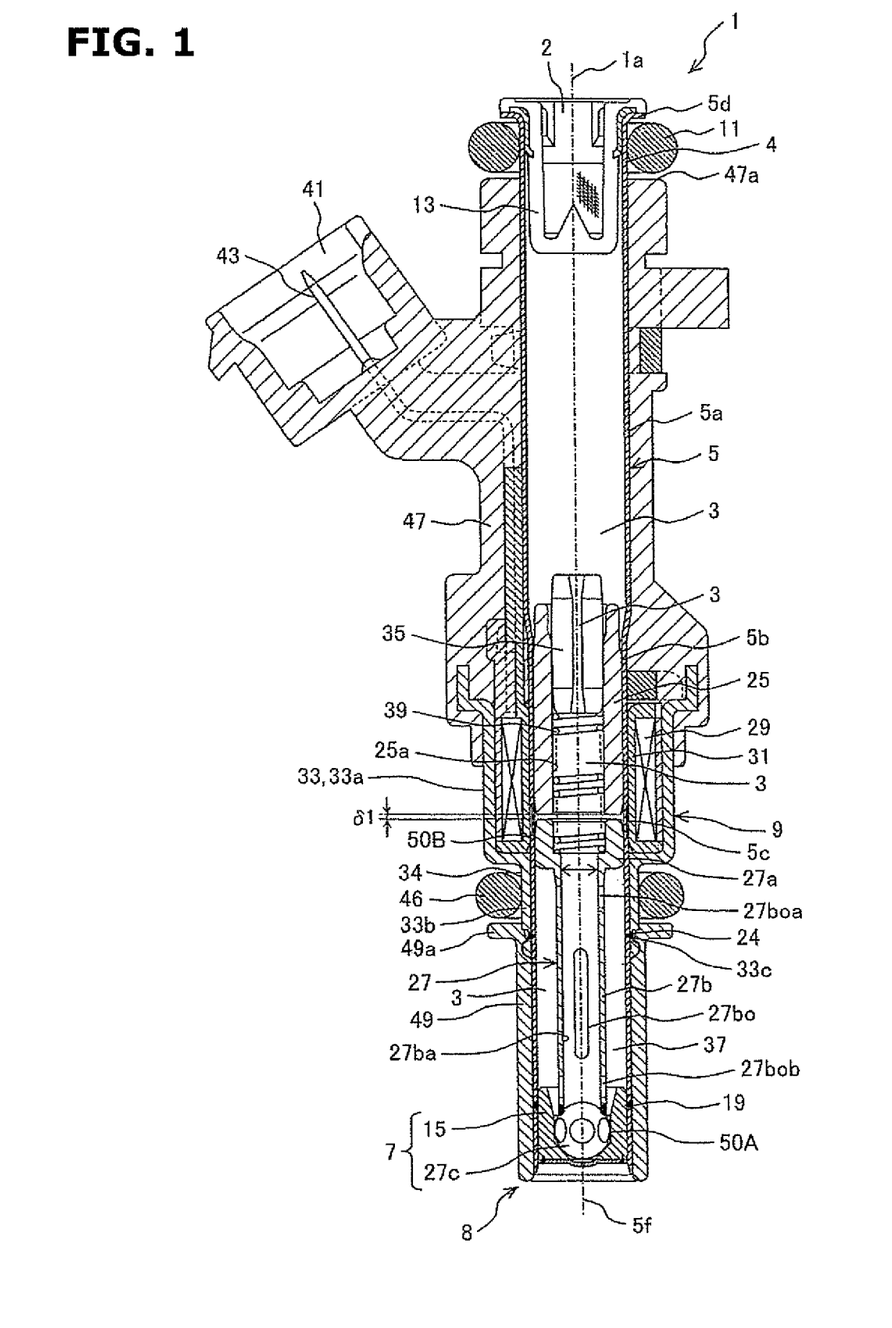

In FIG. 1, an upper end portion (an upper end side) of the fuel injection valve 1 is called a base end portion (a base end side), and a lower end portion (a lower end side) of the fuel injection valve 1 is called a top end portion (a top end side). These base end portion (base end side) and top end portion (top end side) are named based on a fuel flow direction or a connecting structure of the fuel injection valve 1 to a fuel pipe. Further, in the present specification, upper and lower positions of each element or component are based on FIG. 1, and these upper and lower positions have nothing to do with up and down directions in a state in which the fuel injection valve 1 is mounted in an internal combustion engine.

In the fuel injection valve 1, a fuel flow passage (a fuel passage) 3 is formed by a metal-made cylindrical body (a cylindrical member) 5 inside the cylindrical body 5 so as to extend substantially along the axial center line 1a. The cylindrical body 5 is made of metal material such as magnetic stainless steel, and is formed into a step-bore shape in a direction along the axial center line 1a by press working such as deep-drawing. With this, a diameter on one side of the cylindrical body 5 is larger than a diameter on the other side of the cylindrical body 5. That is, the cylindrical body 5 is shaped into a cylindrical or tubular shape.

The cylindrical body 5 is provided, at a base end portion thereof, with a fuel supply port 2. A fuel filter 13 that filters out foreign particles included in the fuel is fixed to the fuel supply port 2.

The cylindrical body 5 is provided, at the base end portion thereof, with a brim portion (a diameter-widening portion) 5d formed by being bent so as to widen in a radially outer side. An O-ring 11 is fitted in a ring-shaped recessed portion (a ring-shaped groove) 4 formed by the brim portion 5d and a base end side end portion 47a of a resin cover 47.

At a top end portion of the cylindrical body 5, a valve part 7 formed by the valve body 27c and a valve seat member 15 is formed. The valve seat member 15 is inserted in an inside on the top end side of the cylindrical body 5, and is fixed to the cylindrical body 5 by laser welding 19 (a laser welding portion 19). The laser welding 19 is performed throughout an entire circumference of the cylindrical body 5 from an outer circumferential side of the cylindrical body 5. The valve seat member 15 could be press-fitted in the inside on the top end side of the cylindrical body 5, then is fixed to the cylindrical body 5 by laser welding.

A driving part 9 to drive the valve body 27c is provided at a middle part of the cylindrical body 5. The driving part 9 is formed by an electromagnetic actuator (an electromagnetic driving part). More specifically, the driving part 9 is formed by a fixed core 25 that is fixed to the inside (an inner circumferential side) of the cylindrical body 5, the movable element (a movable member) 27 that is positioned on the top end side with respect to the fixed core 25 in the cylindrical body 5 and is able to move in a direction along the axial center line 1a, an electromagnetic coil 29 that is set at the outer circumferential side of the cylindrical body 5 at a position where the fixed core 25 and the movable core 27a formed at the movable element 27 face each other through a slight gap δ1, and a yoke 33 that is provided at an outer circumferential side of the electromagnetic coil 29 and covers the electromagnetic coil 29.

The cylindrical body 5 accommodates therein the movable element 27. The cylindrical body 5 encloses the movable core 27a with the cylindrical body 5 facing an outer circumferential surface of the movable core 27a. The cylindrical body 5, the valve seat member 15 and the fixed core 25 form a valve housing that accommodates the movable element 27.

The movable core 27a, the fixed core 25 and the yoke 33 form a closed magnetic path (or a closed magnetic circuit) (a magnetic circuit) where magnetic flux generated by energization to the electromagnetic coil 29 flows. The magnetic flux passes through the slight gap δ1. In order to reduce a leakage flux that flows at the slight gap δ1 portion in the cylindrical body 5, a non-magnetic portion or a feeble magnetic portion 5c having feeble magnetism as compared with other portions of the cylindrical body 5 is provided at a position corresponding to the slight gap δ1 of the cylindrical body 5 (at an outer circumferential side of the slight gap δ1). Hereinafter, the non-magnetic portion and the feeble magnetic portion 5c are simply called a non-magnetic portion 5c for the following explanation.

The non-magnetic portion 5c can be formed by performing a feeble magnetization to the cylindrical body 5 having magnetism. Such a feeble magnetization can be realized, for instance, by heat treatment. Or, the non-magnetic portion 5c could be formed by forming a ring-shaped recess on an outer circumferential surface of the cylindrical body 5 and thinning a portion of the ring-shaped recess which corresponds to the non-magnetic portion 5c. The embodiment shows an example in which the non-magnetic portion 5c is formed by the ring-shaped recess.

The electromagnetic coil 29 is wound around a tubular bobbin 31 that is made of resin material, then is inserted or fitted onto the outer circumference of the cylindrical body 5. The electromagnetic coil 29 is electrically connected to a terminal 43 that is provided at a connector 41. An external driving circuit (not shown) is connected to the connector 41, and a driving current flows to the electromagnetic coil 29 through the terminal 43.

The fixed core 25 is made of magnetic metal material. The fixed core 25 is cylindrical in shape, and has a penetration hole 25a that penetrates the middle of the fixed core 25 in the direction along the axial center line 1a. Axial center lines 25c of the fixed core 25 and the penetration hole 25a coincide with the axial center line 1a of the fuel injection valve 1.

The fixed core 25 is press-fixed to a base end side of a small diameter part 5b of the cylindrical body 5, and is positioned at the middle of the cylindrical body 5. A large diameter part 5a is provided at the base end side of the small diameter part 5b, thereby facilitating assembly of the fixed core 25. The fixed core 25 is fixed to the cylindrical body 5 by welding, or could be fixed to the cylindrical body 5 by press-fitting and welding.

The movable element (the valve component or the valve assembly) 27 is formed by the movable core 27a, the rod part 27b and the valve body 27c. The movable core 27a is a ring-shaped member. The valve body 27c is a member that contacts or is seated on a valve seat 15b (see FIG. 2). The valve seat 15b and the valve body 27c work in cooperation with each other, and open and close the fuel flow passage. The rod part 27b has a narrow cylindrical shape. The rod part 27b is the connecting part that connects the movable core 27a and the valve body 27c. The movable core 27a is connected to the valve body 27c, and drives the valve body 27c in a valve open/closure direction (the direction along the axial center line 1a) by a magnetic attraction force exerted between the fixed core 25 and the movable core 27a.

In the present embodiment, the rod part 27b and the movable core 27a are formed integrally with each other as one member. However, the rod part 27b and the movable core 27a could be formed separately, then these members are fixedly connected to each other. Further, in the present embodiment, the rod part 27b and the valve body 27c are each formed as different members, and the valve body 27c is fixed to the rod part 27b. The fixing of the valve body 27c to the rod part 27b is performed by press-fitting or welding. However, the rod part 27b and the valve body 27c could be formed integrally with each other as one member.

The rod part 27b is cylindrical in shape. The rod part 27b has a hole 27ba that opens at an upper end of the rod part 27b and extends in an axial direction. The rod part 27b further has a communicating hole (an opening) 27bo that communicates with an inner side and with an outer side of the rod part 27b. Between an outer circumferential surface of the rod part 27b and an inner circumferential surface of the cylindrical body 5, a back pressure chamber 37 is provided. The fuel flow passage 3 in the penetration hole 25a of the fixed core 25 communicates with the back pressure chamber 37 through the hole 27ba and the communicating hole 27bo. The hole 27ba and the communicating hole 27bo form the fuel flow passage 3 that connects the fuel flow passage 3 in the penetration hole 25a and the back pressure chamber 37.

A coil spring 39 is provided in the penetration hole 25a of the fixed core 25. One end of the coil spring 39 contacts a spring seat 27ag (see FIG. 3) provided at an inner side of the movable core 27a. The other end of the coil spring 39 contacts an end surface of an adjuster (an adjusting element) 35 that is set in the penetration hole 25a of the fixed core 25. The coil spring 39 is installed between the spring seat 27ag and a lower end (a top end side end surface) of the adjuster (the adjusting element) 35 in a compressed state.

Figure 2:
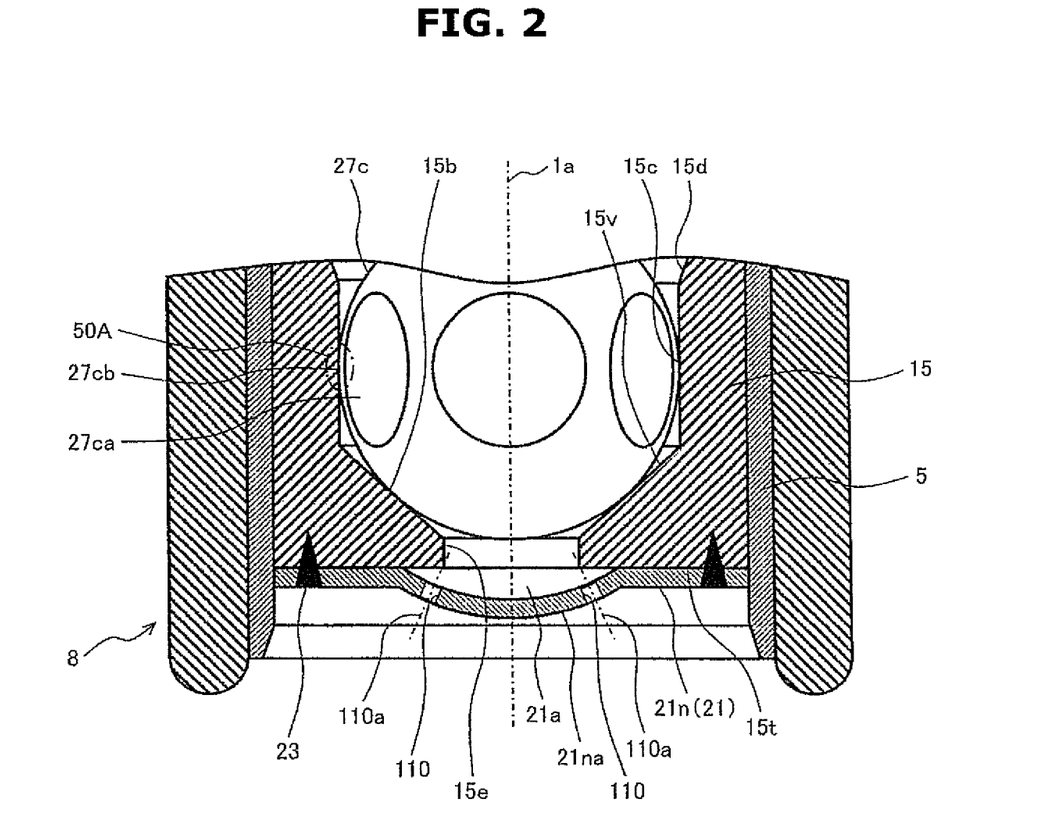
FIG. 2 is an enlarged sectional view of a nozzle part 8 and its surroundings shown in FIG. 1.
Figure 3:
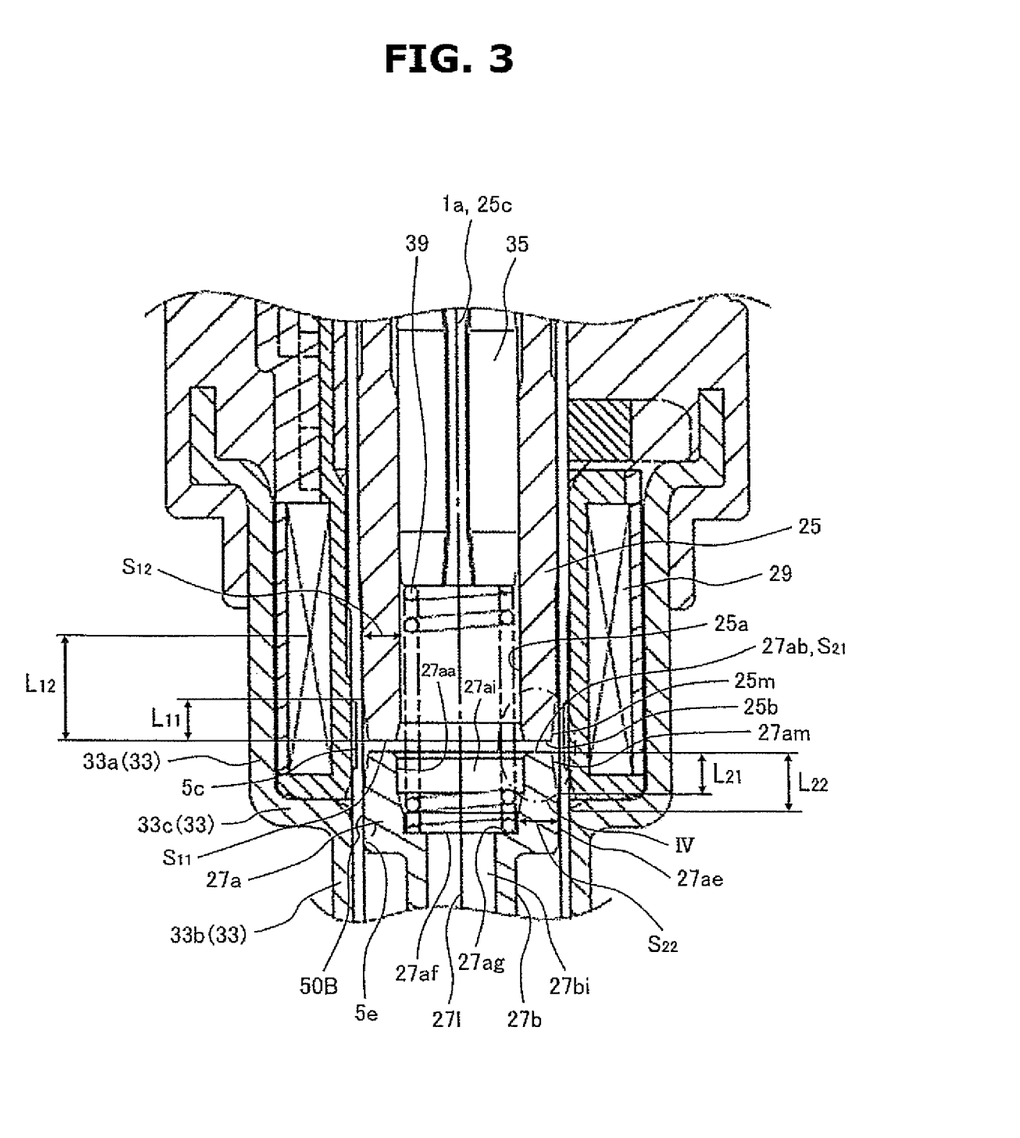
FIG. 3 is an enlarged sectional view of a close area between a movable core 27a and a fixed core 25 shown in FIG. 1.

The coil spring 39 functions as a forcing member that forces the movable element 27 in a direction (a valve closing direction) in which the valve body 27c contacts or is seated on the valve seat 15b (see FIG. 2). By adjusting a position of the adjuster 35 in the direction along the axial center line 1a in the penetration hole 25a, an urging force acting on the movable element 27 (i.e. the valve body 27c) by the coil spring 39 is adjusted.

The adjuster 35 has the fuel flow passage 3 that penetrates the middle of the adjuster 35 in the direction along the axial center line 1a.

The fuel supplied from the fuel supply port 2 flows in the fuel flow passage 3 of a top end side portion of the penetration hole 25a of the fixed core 25 after flowing in the fuel flow passage 3 of the adjuster 35, and flows in the fuel flow passage 3 formed in the movable element 27.

The yoke 33 is made of magnetic metal material. The yoke 33 serves as a housing of the fuel injection valve 1. The yoke 33 is formed into a step-bore shape having a large diameter part 33a and a small diameter part 33b. The large diameter part 33a has such a cylindrical shape as to cover an outer circumference of the electromagnetic coil 29. At a top end side of the large diameter part 33a, the small diameter part 33b whose diameter is smaller than that of the large diameter part 33a is formed. The small diameter part 33b is press-fitted or inserted onto the small diameter part 5b of the cylindrical body 5. With this, an inner circumferential surface of the small diameter part 33b closely contacts the outer circumferential surface of the cylindrical body 5. Here, at lease a part of the inner circumferential surface of the small diameter part 33b faces the outer circumferential surface of the movable core 27a through the cylindrical body 5, and this reduces a magnetic resistance (a magnetic reluctance) of a magnetic path formed at this facing portion.

A ring-shaped recessed portion 33c is formed on an outer circumferential surface of a top end side end portion of the yoke 33 along a circumferential direction. The yoke 33 and the cylindrical body 5 are fixed together at a thinner portion formed on a bottom surface of the ring-shaped recessed portion 33c by laser welding throughout an entire circumference of the ring-shaped recessed portion 33c.

A cylindrical protector 49 having a flange portion 49a is inserted onto the top end portion of the cylindrical body 5, and the top end portion of the cylindrical body 5 is protected by the protector 49. The protector 49 covers a laser welding portion 24 of the yoke 33.

A ring-shaped groove 34 is formed by the flange portion 49a of the protector 49, the small diameter part 33b of the yoke 33 and a step surface between the large diameter part 33a and the small diameter part 33b of the yoke 33. An O-ring 46 is fitted in the ring-shaped groove 34. The O-ring 46 functions as a seal that secures liquid tightness and air tightness between an inner circumferential surface of an insertion hole formed at the internal combustion engine side and an outer circumferential surface of the small diameter part 33b of the yoke 33 when the fuel injection valve 1 is fixed to the internal combustion engine.

The fuel injection valve 1 is molded by a resin cover 47 from the middle up to an almost base end side end portion of the fuel injection valve 1. A top end side end portion of the resin cover 47 covers a part of a base end side of the large diameter part 33a of the yoke 33. Here, the connector 41 is formed integrally with the resin cover 47 with resin of which the resin cover 47 is made.

Next, a structure or configuration of a nozzle part 8 will be explained in detail. FIG. 2 is an enlarged sectional view of the nozzle part 8 and its surroundings shown in FIG. 1.

The valve seat member 15 has a penetration hole that penetrates the valve seat member 15 in the direction along the axial center line 1a. A conical surface 15v whose diameter is reduced toward a downstream side is formed at a certain position in this penetration hole. The valve seat 15b is formed on the conical surface 15v. When the valve body 27c is seated on the valve seat 15b, the fuel flow passage 3 is closed, and when the valve body 27c separates from the valve seat 15b, the fuel flow passage 3 is opened. Here, the conical surface 15v on which the valve seat 15b is formed is also called a valve seat surface. Further, the valve seat 15b and a portion of the valve body 27c which contacts the valve seat 15b are called a seal portion.

A part of the penetration hole, which is located at an upper side with respect to the conical surface 15v, forms a valve body accommodating hole that accommodates therein the valve body 27c. A guide surface 15c that guides the valve body 27c in the direction along the axial center line 1a is formed on an inner circumferential surface of the valve body accommodating hole.

The guide surface 15c and a sliding-contact surface 27cb of the valve body 27c which is in sliding-contact with the guide surface 15c form a downstream side guide portion 50A that guides the valve body 27c for displacement of the valve body 27c.

A diameter-widening portion 15d whose diameter is widened toward an upstream side is formed on an upstream side of the guide surface 15c. The diameter-widening portion 15d facilitates assembly of the valve body 27c, and also acts to enlarge a cross section of the fuel passage. On the other hand, a lower end portion of the valve body accommodating hole is connected to a fuel introduction hole 15e, and a lower end surface of the fuel introduction hole 15e opens to a top end surface 15t of the valve seat member 15.

A nozzle plate 21n is fixed to the top end surface 15t of the valve seat member 15. The nozzle plate 21n is fixed to the valve seat member 15 by laser welding. A laser welding portion 23 is formed at an injection orifice forming area so as to encircle the injection orifice forming area where fuel injection orifices 110 are provided.

The nozzle plate 21n is formed by a plate member (a flat plate) having an even thickness. At the middle of the nozzle plate 21n, a protruding portion (or a bulging portion) 21na is formed so as to protrude or bulge outwards. The bulging portion 21na is formed by a curved surface (e.g. a spherical surface). A fuel chamber 21a is formed at an inner side of the bulging portion 21na. This fuel chamber 21a communicates with the fuel introduction hole 15e formed at the valve seat member 15. The fuel is then supplied to the fuel chamber 21a through the fuel introduction hole 15e.

The plurality of fuel injection orifices 110 are formed at the bulging portion 21na. A shape of the fuel injection orifice is not especially limited. A swirl chamber that provides a swirl force to the fuel could be provided at an upstream side of the fuel injection orifice 110. An axial center line 110a of the fuel injection orifice 110 could be parallel to the axial center line 1a of the fuel injection valve 1, or might be inclined with respect to the axial center line 1a of the fuel injection valve 1. Further, as a structure of the nozzle plate 21n, the bulging portion 21na could be eliminated.

In the present embodiment, the valve part 7 that opens and closes the fuel injection orifice 110 is formed by the valve seat member 15 and the valve body 27c. A fuel injection part 21 by which a form or a shape of fuel spray is determined is formed by the nozzle plate 21n. Then, the valve part 7 and the fuel injection part 21 form the nozzle part 8 for performing the fuel injection. That is, in the nozzle part 8 of the present embodiment, the nozzle plate 21n is secured to the top end surface 15t of a body side (the valve seat member 15) of the nozzle part 8.

Further, in the present embodiment, as the valve body 27c, a ball valve having a spherical shape is used. Therefore, a plurality of cut-out surfaces 27ca are formed at a portion of the valve body 27c which faces the guide surface 15c at certain intervals in a circumferential direction. The fuel passage is formed by these cut-out surfaces 27ca. The valve body 27c could be formed by other valve body than the ball valve. For instance, a needle valve can be used.

A configuration of the movable core 27a of the movable element 27 and its surroundings will be explained in detail with reference to FIG. 3. FIG. 3 is an enlarged sectional view of a close area between the movable core 27a and the fixed core 25 shown in FIG. 1. Here, FIG. 3 shows a state in which the axial center line (the valve axis) 271 of the movable element 27 and the axial center line 1a of the fuel injection valve 1 coincide with each other.

In the present embodiment, the movable core 27a and the rod part 27b are formed integrally with each other as one member. A hollow portion 27aa that is hollowed toward a lower end side is formed at the middle of an end surface 27ab of the movable core 27a. The spring seat 27ag is formed at a bottom of the hollow portion 27aa, and the one end of the coil spring 39 is supported by the spring seat 27ag. Further, the hollow portion 27aa is provided, at the bottom thereof, with an opening 27af that communicates with the inner side of the rod part 27b. The opening 27af forms the fuel passage through which the fuel flowing into a space 27ai of the hollow portion 27aa from the penetration hole 25a of the fixed core 25 flows into a space 27bi of the inner side of the rod part 27b.

The end surface 27ab of the movable core 27a faces an end surface 25b of the fixed core 25. The end surface 27ab and the end surface 25b form magnetic attraction surfaces on which the magnetic attraction force acts mutually. The movable core 27a is configured such that an outer circumferential surface 27ae of the movable core 27a is in sliding-contact with an inner circumferential surface 5e of the cylindrical body 5. That is, the inner circumferential surface 5e forms a guide surface that encloses the movable core 27a and guides the movable element 27 for movement in the valve open/closure direction. In particular, the inner circumferential surface 5e forms an upstream side guide surface with which the outer circumferential surface 27ae of the movable core 27a is in sliding-contact. The upstream side guide surface and the outer circumferential surface 27ae of the movable core 27a form an upstream side guide portion 50B that guides the movable element 27 for displacement of the movable element 27.

In the present embodiment, the movement in the valve open/closure direction of the movable element 27 is guided at two points (two surfaces) of the guide surface (a downstream side guide surface) 15c formed at the valve seat member 15 and the upstream side guide surface formed by the inner circumferential surface 5e of the cylindrical body 5. That is, the movable element 27 is supported by two points (two portions) of the upstream side guide portion 50B and the downstream side guide portion 50A (see FIG. 1), and reciprocates or moves backwards and forwards in the axial center line 1*a* direction while being guided. In this case, the valve body 27*c* of the movable element 27 is guided by the guide surface 15*c*, and the outer circumferential surface 27*ae* of the movable core 27*a* is guided by the upstream side guide surface.

Figure 4:
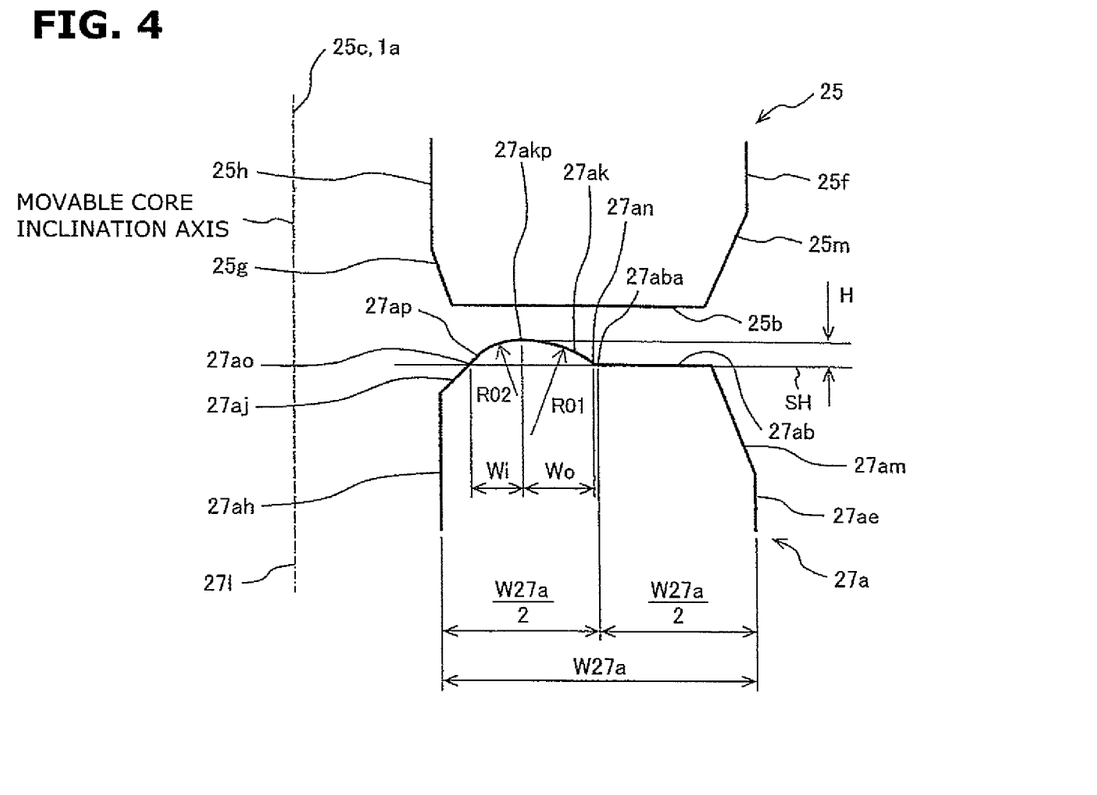
FIG. 4 is an enlarged sectional view of a facing portion (IV portion) of the movable core 27a and the fixed core 25 shown in FIG. 3.

Configurations of the fixed core 25 and the movable core 27*a* will be explained in detail with reference to FIG. 4. FIG. 4 is an enlarged sectional view of a facing portion (IV portion) of the movable core 27*a* and the fixed core 25 shown in FIG. 3. Here, FIG. 4 shows a state in which the axial center line 27l of the movable element 27 and the axial center line 25*c* of the fixed core 25 coincide with each other. The axial center line 25*c* of the fixed core 25 is also an axial center line of a solenoid formed by the electromagnetic coil 29.

At an outer periphery of the fixed core 25, a magnetism narrowing portion (or a magnetism concentrating portion) 25*m* is formed on the end surface (a magnetic gap side end surface) 25*b* side, which faces the movable core 27*a*, of the fixed core 25. In the present embodiment, the magnetism narrowing portion 25*m* is formed by a tapered surface (a tapered portion). The tapered surface is formed between an outer circumferential surface 25*f* and the end surface 25*b* of the fixed core 25. The tapered surface also serves as a chamfered portion formed at a corner portion between the outer circumferential surface 25*f* and the end surface 25*b*. The tapered surface is formed such that an outside diameter of the fixed core 25 is gradually reduced toward the end surface 25*b* from an opposite side (hereinafter, called a movable core-opposite side) to a side facing to the movable core 27*a*. That is, an outside diameter of the tapered surface is reduced toward the end surface 25*b* from the movable core-opposite side.

At an inner periphery of the end surface 25*b* of the fixed core 25, a chamfered portion 25*g* formed by performing a chamfering work to a corner is provided. The chamfered portion 25*g* is formed by a tapered surface (a tapered portion) formed between an inner circumferential surface 25*h* and the end surface 25*b* of the fixed core 25.

At an outer periphery of the movable core 27*a*, a magnetism narrowing portion (or a magnetism concentrating portion) 27*am* is formed on the end surface (a magnetic gap side end surface) 27*ab* side, which faces the fixed core 25, of the movable core 27*a*. In the present embodiment, the magnetism narrowing portion 27*am* is formed by a tapered surface (a tapered portion). The tapered surface is formed such that an outside diameter of the movable core 27*a* is gradually reduced toward the end surface 27*ab* from an opposite side (hereinafter, called a fixed core-opposite side) to a side facing to the fixed core 25. That is, an outside diameter of the tapered surface is reduced toward the end surface 27*ab* from the fixed core-opposite side.

At an inner periphery of the end surface 27*ab* of the movable core 27*a*, a chamfered portion 27*aj* formed by performing a chamfering work to a corner is provided. The chamfered portion 27*aj* is formed by a tapered surface (a tapered portion) formed between an inner circumferential surface 27*ab* and the end surface 27*ab* of the movable core 27*a*.

In the present embodiment, at the inner periphery (an inner peripheral side end portion) of the end surface 27*ab*, a ring-shaped protruding portion (a ring-shaped convex portion) 27*ak* is formed. That is, the protruding portion (the convex portion) 27*ak* is provided at a position that is shifted to a radially inner circumferential side of the end surface 27*ab* where the protruding portion 27*ak* is provided. Therefore, properly speaking, the chamfered portion 27*aj* is formed between the inner circumferential surface 27*ah* of the movable core 27*a* and the protruding portion 27*ak* provided at the end surface 27*ab*.

An apex (a highest point:a maximum point) 27*akp* of the protruding portion 27*ak* is positioned at the inner circumferential surface 27*ah* side with respect to a center position 27*aba* between the outer circumferential surface 27*ae* and the inner circumferential surface 27*ah* in a radial direction of the movable core 27*a*. A width (a radial direction length) of the movable core 27*a* between the outer circumferential surface 27*ae* and the inner circumferential surface 27*ah* is W27*a*, and the center position 27*aba* is a position that is separate from the outer circumferential surface 27*ae* by W27*a*/2 and from the inner circumferential surface 27*ah* by W27*a*/2. Therefore, the apex 27*akp* is separate from the outer circumferential surface 27*ae* by a length that is longer than W27*a*/2, and separate from the inner circumferential surface 27*ah* by a length that is shorter than W27*a*/2. With this, in the present embodiment, the apex 27*akp* can be located at a position close to the inner circumferential side on the end surface 27*ab* of the movable core 27*a*.

Especially in the present embodiment, the protruding portion 27*ak* is formed so that an outer circumferential edge 27*an* of the protruding portion 27*ak* is positioned at the inner circumferential surface 27*ah* side with respect to the center position 27*aba*. Then, the protruding portion 27*ak* as a whole is located at the inner circumferential surface 27*ak* side with respect to the center position 27*aba*. That is, the outer circumferential edge 27*an* of the protruding portion 27*ak* is separate from the outer circumferential surface 27*ae* by a distance that is longer than W27*a*/2, and separate from the inner circumferential surface 27*ah* by a distance that is shorter than W27*a*/2. With this, in the present embodiment, the apex 27*akp* can be located even closer to the inner circumferential side on the end surface 27*ab* of the movable core 27*a*.

A length (a radial direction length) Wi between the apex 27*akp* and an inner circumferential edge 27*ao* of the protruding portion 27*ak* is shorter than a length (a radial direction length) Wo between the apex 27*akp* and the outer circumferential edge 27*an* of the protruding portion 27*ak*.

In the present embodiment, the chamfered portion 27*aj* is formed so as to interfere with the protruding portion 27*ak*. That is, the chamfered portion 27*aj* is formed up to a position (a fixed core 25 side) 27*ap* that is higher than the end surface 27*ab* of the movable core 27*a*, and meets the inner circumferential edge 27*ao* of the protruding portion 27*ak* at the position 27*ap* that is higher than a horizontal surface SH that includes the end surface 27*ab* and is parallel to the end surface 27*ab*.

In the present embodiment, regarding the protruding portion 27*ak*, a portion, which is higher than the horizontal surface SH with the horizontal surface SH including the end surface 27*ab* and being parallel to the end surface 27*ab* being a reference, is assumed to be the protruding portion 27*ak*. Therefore, the inner circumferential edge 27*ao* of the protruding portion 27*ak* coincides with a crossline between the protruding portion 27*ak* or the chamfered portion 27*aj* and the horizontal surface SH. Here, the horizontal surface SH could be set so as to cross not the chamfered portion 27*aj* but a curved surface portion of the protruding portion 27*ak*.

In the present embodiment, at least a portion close to the apex 27*akp* of the protruding portion 27*ak* is formed into a curved surface. That is, the protruding portion 27*ak* is formed so that a height of the protruding portion 27*ak* is lowered with increase in a distance away from the apex 27*akp* in the radial direction, and so that a rate of change of the height of the protruding portion 27*ak* is increased with increase in a distance away from the apex 27*akp* in the radial direction. Further, the protruding portion 27*ak* is formed so that a rate of change of the height with respect to a radial direction length of an inner circumferential side with respect to the apex 27*akp* is larger than that of an outer circumferential side with respect to the apex 27*akp*.

More specifically, the protruding portion 27*ak* on the inner circumferential side with respect to the apex (a top portion) 27*akp* is formed into a curved surface whose radius of curvature is R02, and the protruding portion 27*ak* on the outer circumferential side with respect to the apex 27*akp* is formed into a curved surface whose radius of curvature is R01, then the radius of curvature R02 is set to be smaller than the radius of curvature R01 (R02<R01). That is, the protruding portion 27*ak* on the inner circumferential side with respect to the apex 27*akp* is formed by a curved surface whose curvature is larger than that of the protruding portion 27*ak* on the outer circumferential side with respect to the apex 27*akp*.

Here, it is preferable that the radius of curvature R01 be larger than the radius of curvature R02, and the radius of curvature R01 be 1.5 mm or greater and 50 mm or less. Further, it is preferable that the protruding portion 27*ak* be formed so that a height H from the end surface 27*ab* is 15 μm or greater and 50 μm or less.

Especially in the present embodiment, the protruding portion 27*ak* is formed so that the curved surface whose radius of curvature is R02 and the curved surface whose radius of curvature is R01 are connected or meet each other at the apex 27*akp*. That is, the protruding portion 27*ak* is formed so that the outer circumferential side is formed by the curved surface whose radius of curvature is R01 and the inner circumferential side is formed by the curved surface whose radius of curvature is R02 with the apex 27*akp* being a boundary.

A structure or a shape of the protruding portion 27*ak* will be explained in detail with reference to FIGS. 5A and 5B.

Figure 5A:
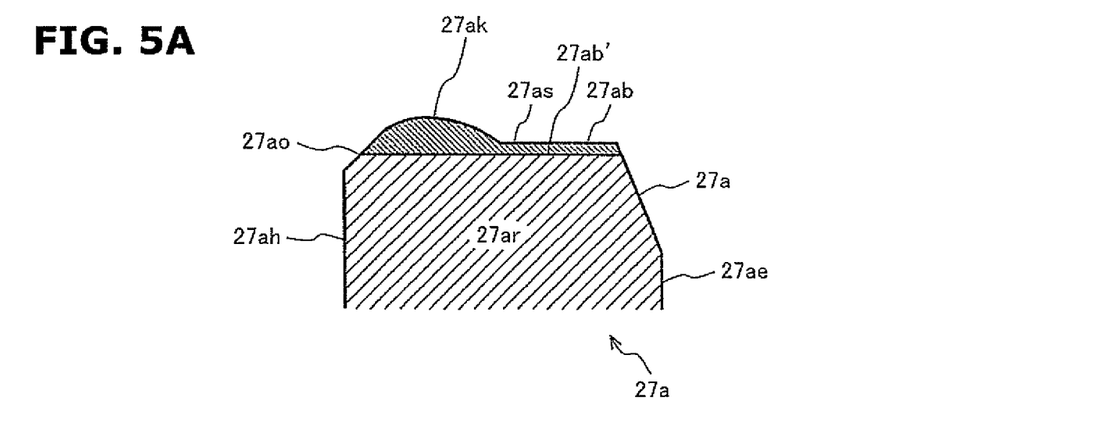

FIG. 5A is an enlarged sectional view showing an example of a structure or a shape of the protruding portion 27*ak* of the movable core 27*a*.

In FIG. 5A, the protruding portion 27*ak* is formed by a surface treatment layer 27*as* provided on the end surface 27*ab*. The surface treatment layer 27*as* is formed by performing a surface treatment such as plating on a surface (an end surface) 27*ab'* of a metal member (a substrate member) 27*ar* that is a substrate. In this case, the surface treatment layer 27*as* is provided on the whole of the end surface 27*ab* (27*ab'*). Then, an inner circumferential side portion of the surface treatment layer 27*as* is bulged from the end surface 27*ab*, and forms the protruding portion 27*ak*.

In this example, the end surface 27*ab* is formed by a surface of the surface treatment layer 27*as*. In this case, the inner circumferential edge 27*ao* of the protruding portion 27*ak* is positioned at a boundary between the surface 27*ab'* of the substrate member 27*ar* and the surface treatment layer 27*as*. And, the inner circumferential edge 27*ao* of the protruding portion 27*ak* is located at a position that is lower than the end surface 27*ab*.

Figure 5B:
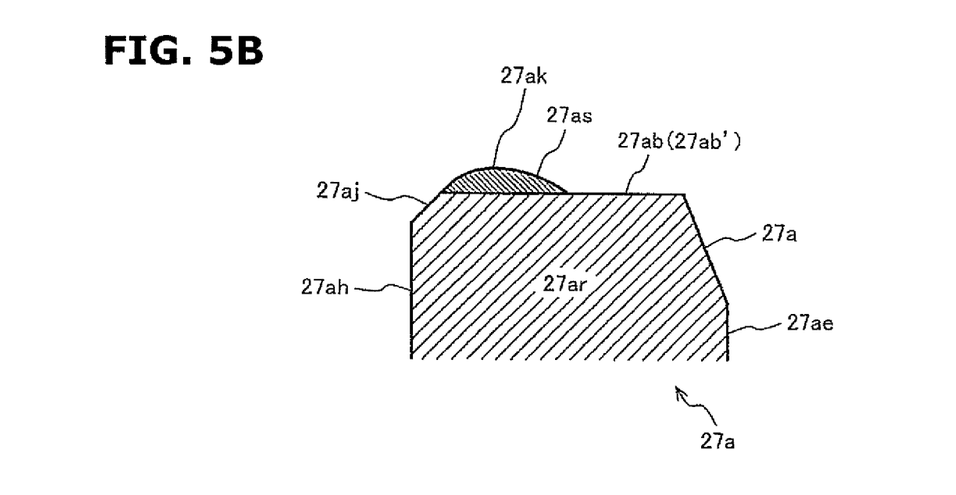

FIG. 5B is an enlarged sectional view showing an example of a structure or a shape of the protruding portion 27*ak* of the movable core 27*a*.

In FIG. 5B, in the same manner as the example of FIG. 5A, the protruding portion 27*ak* is formed by a surface treatment layer 27*as* provided on the end surface 27*ab*. However, in this example, the surface treatment layer 27*as* is provided only at a portion corresponding to the protruding portion 27*ak*. And, the surface 27*ab'* of the substrate member 27*ar* is exposed at outer circumferential side portions except the protruding portion 27*ak*. That is, in this example, the end surface 27*ab* is formed by the surface 27*ab'* of the substrate member 27*ar*.

One of features of the embodiment of the present invention lies in a shape of the protruding portion 27*ak*. Therefore, a method of forming the protruding portion 27*ak*, material of the protruding portion 27*ak* and a structural relationship with the surface treatment layer 27*as* are not limited to the embodiment and examples described above.

Next, effects of the present embodiment will be explained.

In the present embodiment, the protruding portion 27*ak* is provided at the inner circumferential side of the end surface 27*ab* of the movable core 27*a*. The protruding portion 27*ak* is a portion that contacts (strikes against or collides with) the end surface 25*b* of the fixed core 25 when the movable core 27*a* is attracted to the fixed core 25. Because of this, a distance or a space between the protruding portion 27*ak* and the end surface 25*b* of the fixed core 25 is small, and thus a great magnetic attraction force is generated at the protruding portion 27*ak*. In a case where the protruding portion 27*ak* is provided at an outer circumferential side of the end surface 27*ab* of the movable core 27*a*, as compared with the case where the protruding portion 27*ak* is provided at the inner circumferential side of the end surface 27*ab*, an area of the protruding portion 27*ak* on the end surface 27*ab* becomes larger, and an excessive magnetic attraction force is generated, and also the magnetism cutting property is degraded.

In the present embodiment, as described above, the protruding portion 27*ak* is provided at the inner circumferential side of the end surface 27*ab*. With this configuration, as compared with the case where the protruding portion 27*ak* is provided at the outer circumferential side of the end surface 27*ab*, the area of the protruding portion 27*ak* on the end surface 27*ab* can be small, and it is possible to prevent the generation of the excessive magnetic attraction force and also prevent the degradation of the magnetism cutting property.

From the reason mentioned above, it is desirable that the protruding portion 27*ak* should be arranged at as close a position as possible to the inner circumferential side on the end surface 27*ab* of the movable core 27*a*. Especially in the structure in which the protruding portion 27*ak* is formed by the curved surface having the curvature in the radial direction of the movable core 27*a*, it is desirable that the apex 27*akp* of the protruding portion 27*ak* should be located at as close a position as possible to the inner circumferential side on the end surface 27*ab*.

Therefore, in the present embodiment, the length (the radial direction length) Wi between the apex 27*akp* and the inner circumferential edge 27*ao* of the protruding portion 27*ak* is set to be shorter than the length (the radial direction length) Wo between the apex 27*akp* and the outer circumferential edge 27*an* of the protruding portion 27*ak*. And, the radius of curvature R02 of the protruding portion 27*ak* on the inner circumferential side with respect to the apex 27*akp* is set to be smaller than the radius of curvature R01 of the protruding portion 27*ak* on the outer circumferential side with respect to the apex 27*akp* (R02<R01). With these structures, the apex 27*akp* can be located even closer to the inner circumferential side on the end surface 27*ab* of the movable core 27*a*. Hence, in the present embodiment, it is possible to prevent the generation of the excessive magnetic attraction force and also prevent the degradation of the magnetism cutting property.

Further, in the present embodiment, the radius of curvature R01 is set to 1.5 mm or greater and 50 mm or less. It is therefore possible to decrease a stress generated when the protruding portion 27ak contacts (strikes against or collides with) the end surface 25b of the fixed core 25. In addition, in the present embodiment, the height H of the protruding portion 27ak is set to 15 μm or greater and 50 μm or less. It is therefore possible to prevent adhesion of the movable core 27a to the fixed core 25 when the movable core 27a contacts the fixed core 25 in an environment in which the movable core 27a and the fixed core 25 are filled with viscous fluid (the fuel).

Figure 6:
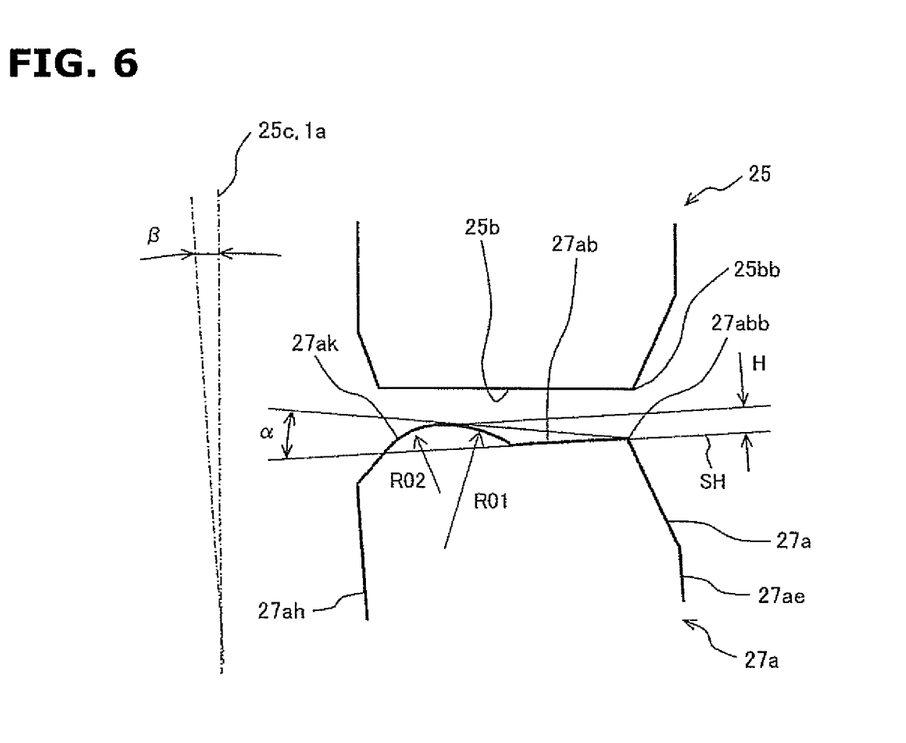
FIG. 6 is an enlarged sectional view showing a state in which the movable core 27a shown in FIG. 4 is inclined.

FIG. 6 is an enlarged sectional view showing a state in which the movable core 27a shown in FIG. 4 is inclined.

FIG. 6 shows a state in which the axial center line 271 of the movable element 27 is inclined with respect to the axial center line 25c of the fixed core 25 at an inclination angle β. If this inclination angle β becomes large, an outer circumference (an outer circumferential edge) 27abb of the end surface 27ab of the movable core 27a contacts the end surface 25b of the fixed core 25, or an outer circumference (an outer circumferential edge) 25bb of the end surface 25b of the fixed core 25 contacts the end surface 27ab of the movable core 27a. Here, since the movable element 27 is supported by the two points (the two portions) of the upstream side guide portion 50B and the downstream side guide portion 50A, the inclination angle β has an upper limit value (a maximum value) βmax.

In the present embodiment, the shape and the height H of the protruding portion 27ak are set so that an angle α formed by a plane that touches the curved surface of the protruding portion 27ak and touches the outer circumference 27abb of the end surface 27ab of the movable core 27a and the horizontal surface SH that is perpendicular to the axial center line 271 of the movable element 27 is greater than the maximum value βmax of the inclination angle β. Here, in the present embodiment, the axial center line 271 coincides with an axial center line of the movable core 27a. With this setting, it is possible to prevent the contact between the outer circumference (the outer circumferential edge) 27abb of the end surface 27ab of the movable core 27a and the end surface 25b of the fixed core 25, or the contact between the outer circumference (the outer circumferential edge) 25bb of the end surface 25b of the fixed core 25 and the end surface 27ab of the movable core 27a, when the movable element 27 is inclined. Reliability of the fuel injection valve 1 can thus be improved.

Next, modified examples of the protruding portion will be explained with reference to FIGS. 7 to 9.

Figure 7:
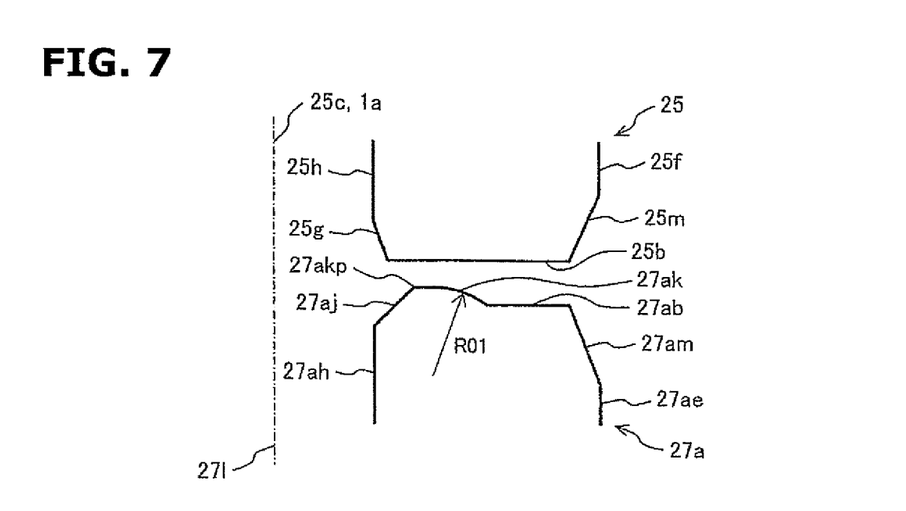
FIG. 7 is an enlarged sectional view of the facing portion (IV portion in FIG. 3) of the movable core 27a and the fixed core 25.

FIG. 7 shows a first modified example of the protruding portion. FIG. 7 is an enlarged sectional view of the facing portion (IV portion in FIG. 3) of the movable core 27a and the fixed core 25.

In this modified example, the protruding portion 27ak is formed by a curved surface having a single radius of curvature R01. Therefore, the top portion (the apex) 27akp is positioned at an innermost circumference of the curved surface. And, the innermost circumference (an innermost circumferential edge), which forms the apex 27akp, of the curved surface meets or connected to the chamfered portion 27aj. The other structures are the same as those of the above embodiment.

The present modified example can also obtain the same effects as those of the above embodiment. In addition, in the present modified example, since the curved surface portion of the radius of curvature R02 is not provided, the apex 27akp can be located at a position close to the inner circumferential side on the end surface 27ab of the movable core 27a.

Figure 8:
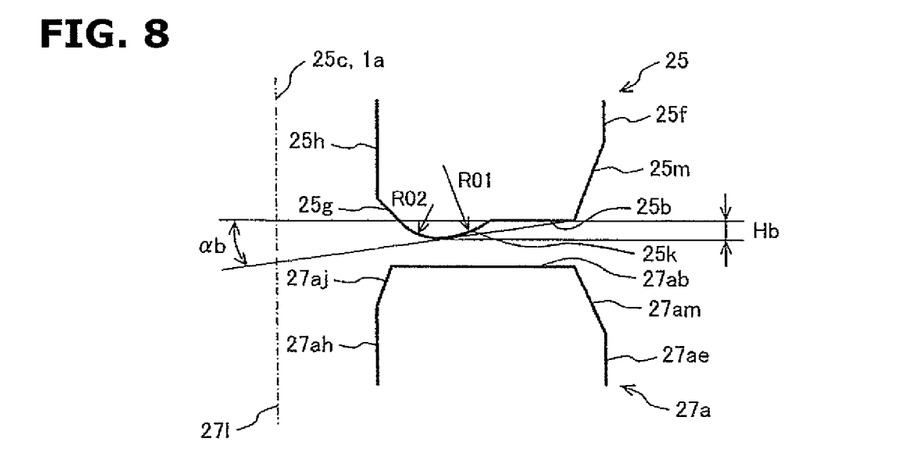
FIG. 8 is an enlarged sectional view of the facing portion (IV portion in FIG. 3) of the movable core 27a and the fixed core 25.

FIG. 8 shows a second modified example of the protruding portion. FIG. 8 is an enlarged sectional view of the facing portion (IV portion in FIG. 3) of the movable core 27a and the fixed core 25.

In this modified example, instead of the protruding portion 27ak, a protruding portion 25k is formed at the end surface 25b of the fixed core 25. In the same manner as the protruding portion 27ak, the protruding portion 25k is provided at the end surface 25b.

Therefore, a relationship of the protruding portion 27ak with the end surface 27ab of the movable core 27a corresponds to a relationship of the protruding portion 25k with the end surface 25b of the fixed core 25. That is, the radius of curvature R01 and the radius of curvature R02 of the protruding portion 27ak (R01>R02) which are explained by FIG. 4 are applied to those of a curved surface of the protruding portion 25k. Further, the protruding portion 25k could be formed into the same shape as the above first modified example.

In this modified example, in the case where the axial center line 271 of the movable element 27 is inclined with respect to the axial center line 25c of the fixed core 25 at the inclination angle β, by the protruding portion 25k provided at the end surface 25b of the fixed core 25, contact between the outer circumference (the outer circumferential edge) of the end surface 27ab of the movable core 27a and the end surface 25b of the fixed core 25, or contact between the outer circumference (the outer circumferential edge) of the end surface 25b of the fixed core 25 and the end surface 27ab of the movable core 27a, can be prevented. To achieve this, a shape and a height Hb of the protruding portion 25k are set so that an angle αb formed by a plane that touches the curved surface of the protruding portion 25k and touches the outer circumferential edge of the end surface 25b of the fixed core 25 and a plane that is perpendicular to the axial center line 25c of the fixed core 25 is greater than the maximum value βmax of the inclination angle β.

Here, it is preferable that the radius of curvature R01 be 1.5 mm or greater and 50 mm or less. Further, it is preferable that the protruding portion 25k be formed so that a height H from the end surface 27ab is 15 μm or greater and 50 μm or less.

The present modified example can also obtain the same effects as those of the above embodiment and the above modified example.

Figure 9:
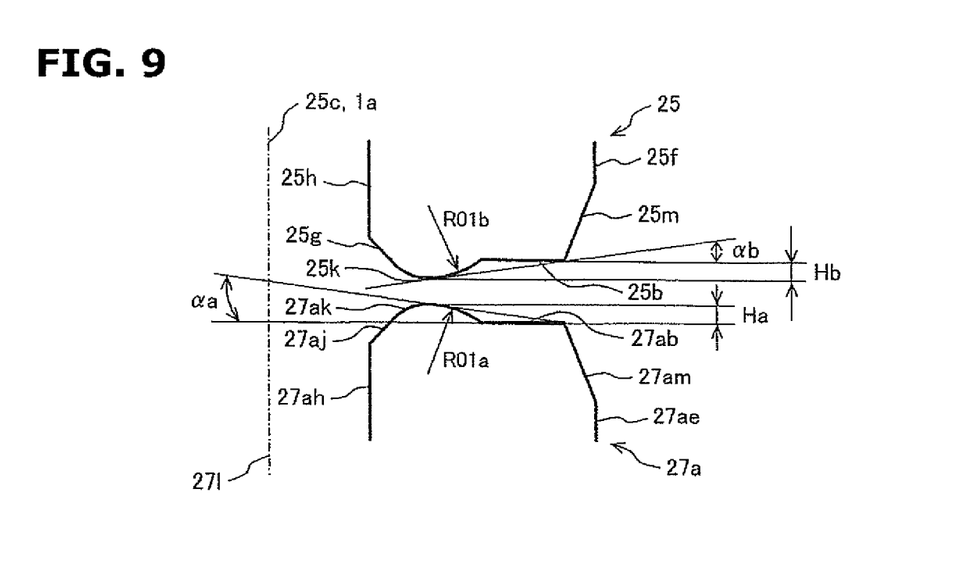
FIG. 9 is an enlarged sectional view of the facing portion (IV portion in FIG. 3) of the movable core 27a and the fixed core 25.

FIG. 9 shows a third modified example of the protruding portion. FIG. 9 is an enlarged sectional view of the facing portion (IV portion in FIG. 3) of the movable core 27a and the fixed core 25.

This modified example is configured so that the protruding portion 25k is formed at the end surface 25b of the fixed core 25, and the protruding portion 27ak is formed at the end surface 27ab of the movable core 27a, then the protruding portion 25k and the protruding portion 27ak contact each other. The protruding portion 25k and the protruding portion 27ak of the present modified example could be formed into the same shape as that (the radius of curvature R01, the radius of curvature R02, the height H, etc.) of the protruding portion 27ak of the first modified example. Or, either one of the protruding portion 25k or the protruding portion 27ak might be formed into the same shape as that (the radius of curvature R01, the radius of curvature R02, the height H, etc.) of the protruding portion 27*ak* of the first modified example.

In this modified example, in the case where the axial center line 271 of the movable element 27 is inclined with respect to the axial center line 25*c* of the fixed core 25 at the inclination angle by the protruding portion 27*ak* provided at the movable core 27*a* and the protruding portion 25*k* provided at the fixed core 25, contact between the outer circumferential edge of the end surface 27*ab* of the movable core 27*a* and the end surface 25*b* of the fixed core 25, or contact between the outer circumferential edge of the end surface 25*b* of the fixed core 25 and the end surface 27*ab* of the movable core 27*a*, can be prevented. To achieve this, angles αa and αb and protruding heights Ha and Hb are considered as follows.

Angle αa: an angle formed by a plane that touches the curved surface of the protruding portion 27*ak* and touches the outer circumferential edge of the end surface 27*ab* of the movable core 27*a* and a plane that is perpendicular to the axial center line 271 of the movable element 27.

Angle αb: an angle formed by a plane that touches the curved surface of the protruding portion 25*k* and touches the outer circumferential edge of the end surface 25*b* of the fixed core 25 and a plane that is perpendicular to the axial center line 25*c* of the fixed core 25.

The height Ha: a protruding height of the protruding portion 27*ak* from the end surface 27*ab*.

The height Hb: a protruding height of the protruding portion 25*k* from the end surface 25*b*.

Then, shapes and the protruding heights Ha and Hb of the protruding portion 27*ak* and the protruding portion 25*k* are set so that an angle α(=αa+αb) formed by adding αa to αb is greater than the maximum value βmax of the inclination angle β (i.e. α>βmax). In this case, it is preferable that a total value H0 (=Ha+Hb) formed by adding Ha to Hb be 15 µm or greater and 50 µm or less.

Further, an effective contact radius of the protruding portion 27*ak* and the protruding portion 25*k* in this modified example is given by an (expression 1).

$$R0=(R01a \times R01b)/(R01a+R01b) \quad \text{(expression 1)}$$

In this case, R0, R01*a* and R01*b* satisfy a relationship of an (expression 2).

$$(1/R0)=(1/R01a)+(1/R01b) \quad \text{(expression 2)}$$

Then, it is preferable that R0 be 1.5 mm or greater and 50 mm or less.

The present modified example can also obtain the same effects as those of the above embodiment and the above modified example. In addition, in the present modified example, a space or a distance between the protruding portion 25*k* and the protruding portion 27*ak* suddenly becomes larger with increase in a distance in the radial direction away from a contact point between the protruding portion 25*k* and the protruding portion 27*ak*. Therefore, the present modified example improves the effect of preventing the generation of the excessive magnetic attraction force and also improves the effect of preventing the degradation of the magnetism cutting property.

Figure 10:
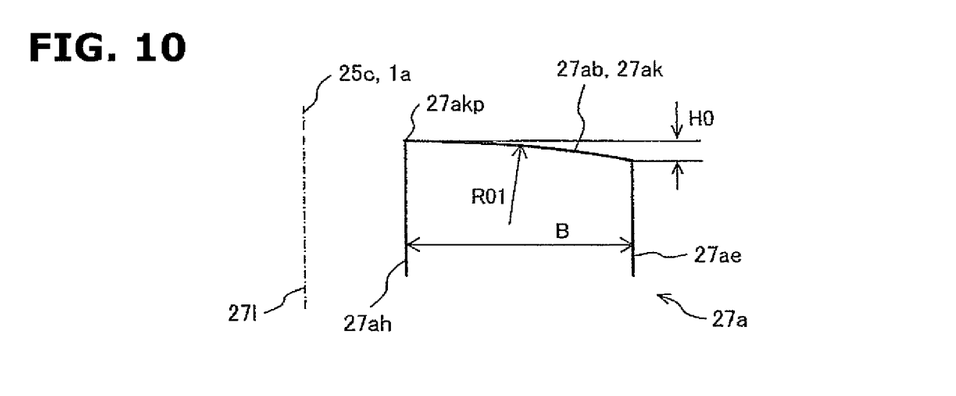

FIG. 10 shows a fourth modified example of the protruding portion. FIG. 10 is an enlarged sectional view of the movable core 27*a*, and shows the movable core 27*a* and its surroundings facing to the fixed core 25.

In the present modified example, a width B as a whole in the radial direction of the end surface 27*ab* of the movable core 27*a* is formed by a curved surface. That is, this corresponds to such a shape that the protruding portion 27*ak* is formed throughout the entire end surface 27*ab*. Especially in the present modified example, a surface from the inner circumferential surface 27*ab* to the outer circumferential surface 27*ae* of the movable core 27*a* is formed by a curved surface having a single radius of curvature R01 in the radial direction. This curved surface having the radius of curvature R01 corresponds to the curved surface portion formed between the apex 27*akp* and the outer circumferential edge 27*an* of the protruding portion 27*ak* which is explained by FIG. 4.

A curved surface portion having the radius of curvature R02(R02<R01), which is the same as that explained by FIG. 4, could be formed at an inner circumferential side from the apex 27*akp* of the protruding portion 27*ak*. Further, a chamfered portion, which is the same as the chamfered portion 27*aj* explained by FIG. 4, could be formed at an inner circumferential edge portion of the end surface 27*ab*. Moreover, a tapered surface, which is the same as the tapered surface explained by FIG. 4, could be formed at an outer circumferential edge portion of the end surface 27*ab*.

Although the above embodiment and modified examples are the ones in which the present invention is applied to the fuel injection valve, the present invention can be applied to a device having an electromagnetic driving device (an electromagnetic solenoid) except the fuel injection valve.

The present invention can improve the magnetism cutting property. Therefore, when applying the present invention to the fuel injection valve, a valve-closing time is shortened, then the valve-closing response can be improved.

Figure 11:
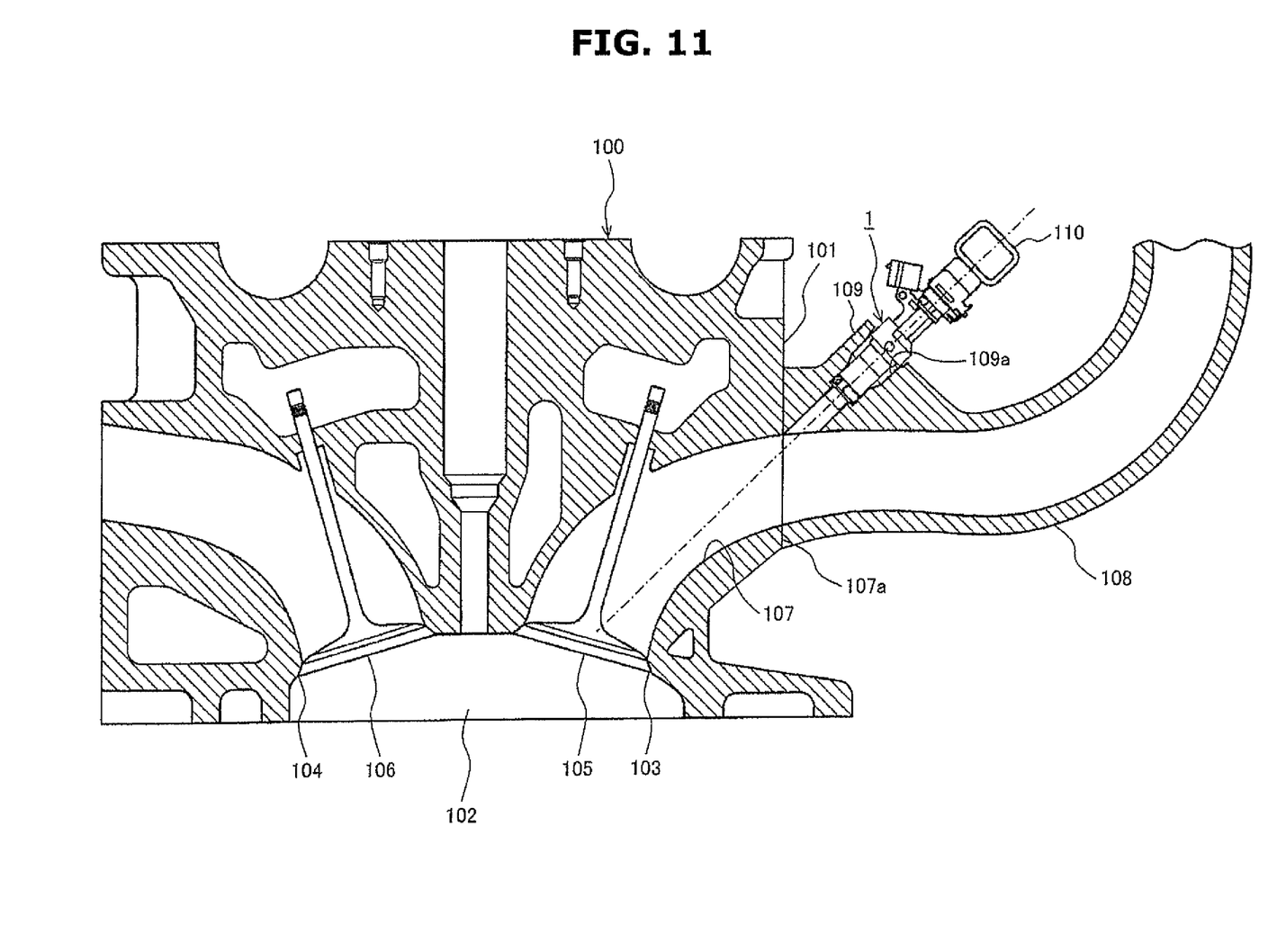
FIG. 11 is a sectional view of an internal combustion engine in which the fuel injection valve 1 is mounted.

Next, the internal combustion engine in which the fuel injection valve 1 of the present invention is mounted will be explained with reference to FIG. 11. FIG. 11 is a sectional view of the internal combustion engine in which the fuel injection valve 1 is mounted.

A cylinder 102 is formed in an engine block 101 of an internal combustion engine 100, and an intake port 103 and an exhaust port 104 are provided at a top of the cylinder 102. The intake port 103 is provided with an intake valve 105 that opens/closes the intake port 103. The exhaust port 104 is provided with an exhaust valve 106 that opens/closes the exhaust port 104. An intake pipe 108 is connected to an entry side end portion 107*a* of an intake passage 107 that is formed at the engine block 101 and communicates with the intake port 103.

A fuel pipe 110 is connected to the fuel supply port 2 (see FIG. 1) of the fuel injection valve 1.

A fixing portion 109 for the fuel injection valve 1 is formed at the intake pipe 108, and the fixing portion 109 is provided with an insertion hole 109*a* into which the fuel injection valve 1 is inserted. The insertion hole 109*a* penetrates an inside surface of the intake pipe 108 up to an intake passage of the intake pipe 108, and the fuel jet or injected from the fuel injection valve 1 inserted in the insertion hole 109*a* is jet or injected into the intake passage. In a case of two-direction spray, two intake ports 103 are provided at the engine block 101, and the fuel sprays are injected toward each intake port 103 (each intake valve 105).

The present invention has been explained above on the basis of the above embodiment and modified examples. However, configuration or structure of each element or component is not limited to that of the embodiment and the modified examples. A part of the configuration or structure could be removed, or an element or a component that is disclosed in the above embodiment and modified examples could be added. Further, the element or the component in the above embodiment and modified examples might be changed or added.

As the electromagnetic solenoid based on the above embodiment and modified examples, for instance, the followings are raised.

As one aspect of the present invention, an electromagnetic solenoid comprises: a movable core having an end surface that is formed between an inner circumferential surface and an outer circumferential surface of the movable core; a fixed core having an end surface that is formed between an inner circumferential surface and an outer circumferential surface of the fixed core and faces the end surface of the movable core; and a ring-shaped protruding portion formed at at least either one of the end surface of the movable core or the end surface of the fixed core. And, the protruding portion is provided at a position that is shifted to a radially inner circumferential side of the end surface where the protruding portion is provided, and a length between an apex and an inner circumferential edge of the protruding portion is shorter than a length between the apex and an outer circumferential edge of the protruding portion.

As a preferable aspect of the electromagnetic solenoid, at least an outer circumferential side of the protruding portion is formed into a curved surface having a curvature.

As another preferable aspect of the electromagnetic solenoid, in any of the above electromagnetic solenoids, when an angle formed by a plane that touches the curved surface of the protruding portion and touches an outer circumference of the end surface of the movable core and a plane that is perpendicular to an axial center line of the movable core is $\alpha$, and when a maximum inclination angle of the axial centerline of the movable core with respect to an axial center line of the fixed core is $\beta max$, a relationship of $\alpha > \beta max$ is satisfied.

As another preferable aspect of the electromagnetic solenoid, in any of the above electromagnetic solenoids, the apex of the protruding portion is positioned at the inner circumferential edge of the end surface where the protruding portion is provided, and the length between the apex and the inner circumferential edge is zero.

As another preferable aspect of the electromagnetic solenoid, in any of the above electromagnetic solenoids, the protruding portion is formed so that an outer circumferential side of the protruding portion is formed by a curved surface whose radius of curvature is $R01$ and an inner circumferential side of the protruding portion is formed by a curved surface whose radius of curvature is $R02$ with the apex being a boundary, and a relationship of $R01 \geq R02$ is satisfied.

As another preferable aspect of the electromagnetic solenoid, in any of the above electromagnetic solenoids, the protruding portion is formed by a surface treatment layer that is formed by performing a surface treatment on the end surface where the protruding portion is provided.

As the fuel injection valve based on the above embodiment and modified examples, for instance, the followings are raised.

As one aspect of the present invention, a fuel injection valve comprises: a valve seat and a valve body opening and closing a fuel passage in cooperation with each other; a movable element having at one end thereof the valve body and having at the other end thereof a movable core; and a fixed core attracting the movable core by exerting a magnetic attraction force on the movable core. And, the movable core has an end surface that is formed between an inner circumferential surface and an outer circumferential surface of the movable core, the fixed core has an end surface that is formed between an inner circumferential surface and an outer circumferential surface of the fixed core and faces the end surface of the movable core, a ring-shaped protruding portion is formed at at least either one of the end surface of the movable core or the end surface of the fixed core, the protruding portion is provided at a position that is shifted to a radially inner circumferential side of the end surface where the protruding portion is provided, and a length between an apex and an inner circumferential edge of the protruding portion is shorter than a length between the apex and an outer circumferential edge of the protruding portion.

As a preferable aspect of the fuel injection valve, at least an outer circumferential side of the protruding portion is formed into a curved surface having a curvature.

As another preferable aspect of the fuel injection valve, in any of the above fuel injection valves, when an angle formed by a plane that touches the curved surface of the protruding portion and touches an outer circumference of the end surface of the movable core and a plane that is perpendicular to an axial center line of the movable core is $\alpha$, and when a maximum inclination angle of the axial center line of the movable core with respect to an axial center line of the fixed core is $\beta max$, a relationship of $\alpha > \beta max$ is satisfied.

As another preferable aspect of the fuel injection valve, in any of the above fuel injection valves, the apex of the protruding portion is positioned at the inner circumferential edge of the end surface where the protruding portion is provided, and the length between the apex and the inner circumferential edge is zero.

As another preferable aspect of the fuel injection valve, in any of the above fuel injection valves, the protruding portion is formed so that an outer circumferential side of the protruding portion is formed by a curved surface whose radius of curvature is $R01$ and an inner circumferential side of the protruding portion is formed by a curved surface whose radius of curvature is $R02$ with the apex being a boundary, and a relationship of $R01 \geq R02$ is satisfied.

As another preferable aspect of the fuel injection valve, in any of the above fuel injection valves, the radius of curvature $R01$ of the curved surface formed at the outer circumferential side of the protruding portion with the apex being the boundary satisfies a relationship of $R01 \geq 1.5$ mm.

As another preferable aspect of the fuel injection valve, in any of the above fuel injection valves, the protruding portion is formed by a surface treatment layer that is formed by performing a surface treatment on the end surface where the protruding portion is provided.

As another preferable aspect of the fuel injection valve, in any of the above fuel injection valves, a height of the protruding portion is 15 µm or greater.

The invention claimed is:

1. An electromagnetic solenoid comprising:
   a movable core having an end surface that is formed between an inner circumferential surface and an outer circumferential surface of the movable core;
   a fixed core having an end surface that is formed between an inner circumferential surface and an outer circumferential surface of the fixed core and faces the end surface of the movable core; and
   a ring-shaped protruding portion formed at at least either one of the end surface of the movable core or the end surface of the fixed core and contacting the fixed core or the movable core respectively which the protruding portion faces, and
   the protruding portion being provided at a position that is shifted to a radially inner circumferential side of the end surface where the protruding portion is provided, a length between an apex and an inner circumferential edge of the protruding portion being shorter than a length between the apex and an outer circumferential edge of the protruding portion, the protruding portion being formed by a first curved surface whose radius of curvature is R01 at an outer circumferential side of the protruding portion and a second curved surface whose radius of curvature is R02 at an inner circumferential side of the protruding portion with the apex being a boundary, a relationship of R01>R02 being satisfied, and the apex where the first curved surface and the second curved surface are connected being formed by a curved surface.

2. The electromagnetic solenoid as claimed in claim 1, wherein:

when an angle formed by a plane that touches the curved surface of the protruding portion and touches an outer circumference of the end surface of the movable core and a plane that is perpendicular to an axial center line of the movable core is α, and when a maximum inclination angle of the axial center line of the movable core with respect to an axial center line of the fixed core is βmax, a relationship of α>βmax is satisfied.

3. The electromagnetic solenoid as claimed in claim 1, wherein:

the protruding portion is formed by a surface treatment layer that is formed by performing a surface treatment on the end surface where the protruding portion is provided.

4. A fuel injection valve comprising:

a valve seat and a valve body opening and closing a fuel passage in cooperation with each other;

a movable element having at one end thereof the valve body and having at the other end thereof a movable core; and a fixed core attracting the movable core by exerting a magnetic attraction force on the movable core, and wherein the movable core has an end surface that is formed between an inner circumferential surface and an outer circumferential surface of the movable core, the fixed core has an end surface that is formed between an inner circumferential surface and an outer circumferential surface of the fixed core and faces the end surface of the movable core, a ring-shaped protruding portion is formed at at least either one of the end surface of the movable core or the end surface of the fixed core and contacts the fixed core or the movable core respectively which the protruding portion faces, the protruding portion is provided at a position that is shifted to a radially inner circumferential side of the end surface where the protruding portion is provided, a length between an apex and an inner circumferential edge of the protruding portion is shorter than a length between the apex and an outer circumferential edge of the protruding portion, the protruding portion is formed by a first curved surface whose radius of curvature is R01 at an outer circumferential side of the protruding portion and a second curved surface whose radius of curvature is R02 at an inner circumferential side of the protruding portion with the apex being a boundary, a relationship of R01>R02 is satisfied, and the apex where the first curved surface and the second curved surface are connected is formed by a curved surface.

5. The fuel injection valve as claimed in claim 4, wherein:

when an angle formed by a plane that touches the curved surface of the protruding portion and touches an outer circumference of the end surface of the movable core and a plane that is perpendicular to an axial center line of the movable core is α, and when a maximum inclination angle of the axial center line of the movable core with respect to an axial center line of the fixed core is βmax, a relationship of α>βmax is satisfied.

6. The fuel injection valve as claimed in claim 4, wherein:

the radius of curvature R01 of the curved surface formed at the outer circumferential side of the protruding portion with the apex being the boundary satisfies a relationship of R01>1.5 mm.

7. The fuel injection valve as claimed in claim 4, wherein:

the protruding portion is formed by a surface treatment layer that is formed by performing a surface treatment on the end surface where the protruding portion is provided.

8. The fuel injection valve as claimed in claim 4, wherein:

a height of the protruding portion is 15 μm or greater.

* * * * *